H. P. TOWNSEND.
TOOLING MACHINE.
APPLICATION FILED MAR. 12, 1910.

1,058,813.

Patented Apr. 15, 1913.
5 SHEETS—SHEET 1.

Fig. 1.

WITNESSES
James J. Caffrey.
N. W. Cummins.

INVENTOR
Harry P. Townsend.
BY HIS ATTORNEY
Arthur B. Jenkins.

H. P. TOWNSEND.
TOOLING MACHINE.
APPLICATION FILED MAR. 12, 1910.

1,058,813.

Patented Apr. 15, 1913.
5 SHEETS—SHEET 4.

H. P. TOWNSEND.
TOOLING MACHINE.
APPLICATION FILED MAR. 12, 1910.

1,058,813.

Patented Apr. 15, 1913.
5 SHEETS—SHEET 5.

WITNESSES
James J. Caffrey.
N. H. Cummins.

INVENTOR
Harry P. Townsend
BY HIS ATTORNEY
Arthur B. Jenkins

# UNITED STATES PATENT OFFICE.

HARRY P. TOWNSEND, OF WATERBURY, CONNECTICUT, ASSIGNOR TO THE E. J. MANVILLE MACHINE COMPANY, OF WATERBURY, CONNECTICUT, A CORPORATION OF CONNECTICUT.

TOOLING-MACHINE.

1,058,813.     Specification of Letters Patent.     Patented Apr. 15, 1913.

Application filed March 12, 1910. Serial No. 548,892.

*To all whom it may concern:*

Be it known that I, HARRY P. TOWNSEND, a citizen of the United States, and a resident of Waterbury, in the county of New Haven and State of Connecticut, have invented a new Improvement in Tooling-Machines, of which the following is a specification.

My invention relates to the class of machines for performing various operations usually of a cutting nature, upon blanks held within a chuck or like device, and the object of my invention is to provide a machine of this class having novel features of advantage and utility.

One form of machine embodying my invention and in the use of which the objects sought may be attained is illustrated in the accompanying drawings, in which—

In the accompanying drawings the numeral 20 denotes a table supported on legs 21 and constructed of any suitable form and of material common to devices of this class and which commonly rest in a pan, not herein shown. A driving shaft 22 is mounted in bearings 23 on the table, and supports pulleys 24 secured to the outer end of the shaft and affording a driving means as from a belt passing around the pulleys from any suitable source. A cam shaft 25 has its bearings 26 formed in brackets depending from the table, this cam shaft being driven as by means of a train of gears 27 mounted on the end of the machine, including a pinion 28 secured to the driving shaft and a gear 29 secured to the cam shaft, the latter bearing cams to be hereinafter described for operating different parts of the machine.

Spindles for holding articles to be operated upon are mounted on the table, there being a plural number of spindles all served by devices placed for each. In the machine herein shown two spindles constitute the blank holding means, but where the description herein refers to only one of these spindles it will be understood that it applies equally to both, and likewise where but a single device for operating in connection with a single spindle is described, it will be understood that such description applies equally to all devices of like or similar construction and operation appurtenant to other spindles, wherever such may occur. The spindle 30 is mounted in bearings 31, 32 rising from the table and is driven from any suitable source of power, as shown herein a pulley 33 to receive a belt being employed. The driving shaft and spindle in the embodiment of my invention herein illustrated are separately driven.

Figure 1:
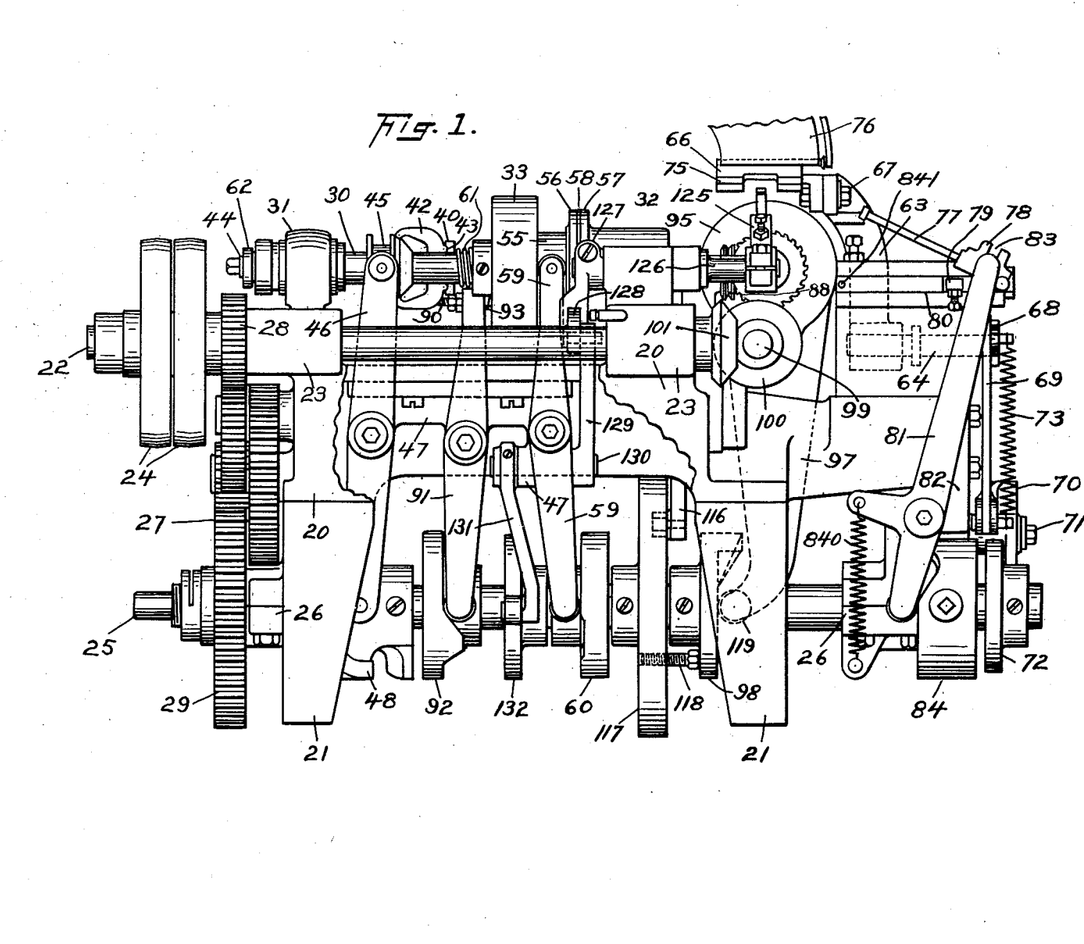
Figure 1 is a view in front elevation of a machine embodying my invention with parts broken away to show construction.
Figure 2:
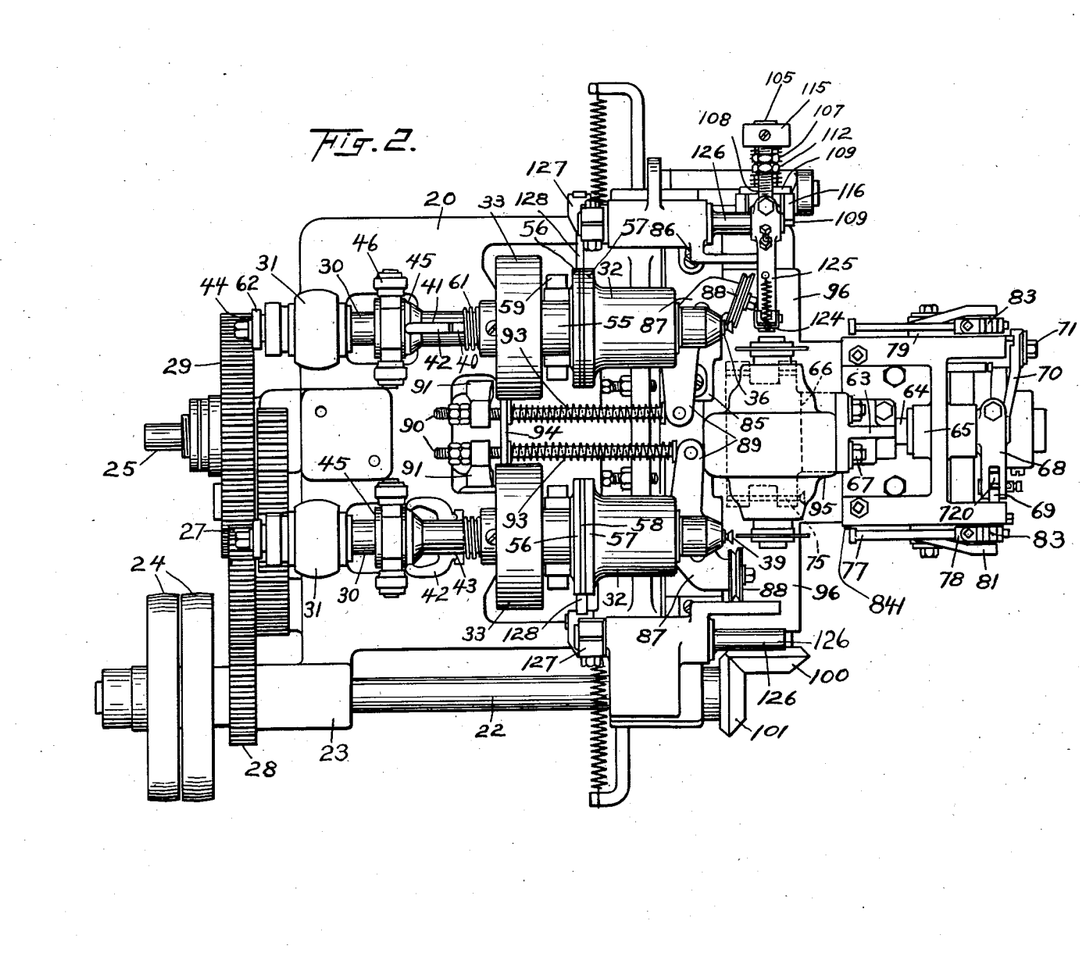
Fig. 2 is a top plan view of the machine, the carrier plate being removed, but shown in dotted outline, and the spring fingers also being removed on one side.
Figure 3:
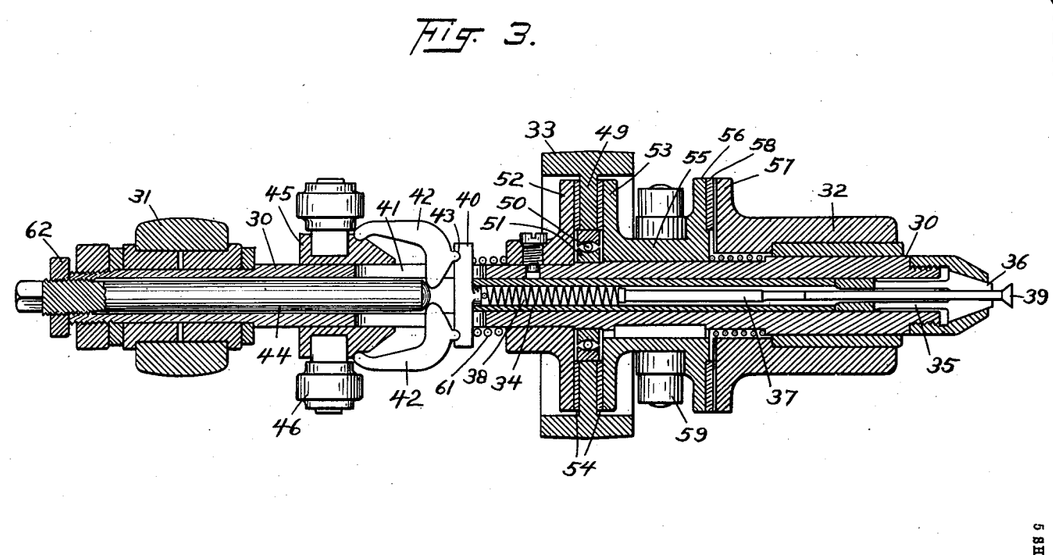
Fig. 3 is a view in central longitudinal section through a spindle.

A chucking tube 34 is located within the spindle and against the end of a collet 35 having chuck jaws 36, the chucking tube being movable longitudinally within the spindle. An ejector 37 seated against an ejector spring 38 is located within the chucking tube in position to press against the end of a blank 39 held in the jaws to be operated upon by the machine.

A chucking lever bar 40 is supported by the chucking tube 34, the ends of the bar projecting through slots 41 in the spindle, and angularly formed chucking levers 42 are pivotally mounted in recesses 43 in the bar, the inner ends of the levers resting against an adjustable stop rod 44 extending through the spindle, to the outer end thereof, and the opposite ends of the chucking levers rest against a chucking cone 45 mounted to slide upon the spindle.

The improved construction of the chuck operating mechanism enables accuracy in operation of the machine to be obtained without extreme accuracy in the formation of parts and especially in such formation of the chucking levers. In accomplishing this result the chucking lever bar 40 is placed in the chucking tube 34 that it may, if required, have a tipping action caused by force applied to the chucking levers 42, and the end of the stop rod 44 is also subject to movement caused by force applied to said chucking levers, this movement of the end of the stop rod being lateral owing to spring action permitted by the extreme length of the rod from its bearing in the spindle 30, and also by reason of the space provided between the outer surface of the rod and the inner surface of the spindle. This construction permitting movement of the stop rod and chucking lever bar, as described, causes the chucking levers 42 to always bear with equal force upon the chucking cone 45 so that practically all the force applied to the cone to move the chucking tube 34 is transmitted to that tube and is not partially spent in the frictional contact between the cone and spindle caused by excessive lateral pressure of one lever over the other, which excessive frictional contact would occur in case the levers were not accurately formed and said stop rod and bar were rigidly held.

A cone operating lever 46 is pivotally mounted in a bracket 47 secured to the under side of the table, the lower end of this lever being constructed to engage and be operated by a chucking cam 48 secured to the cam shaft 25. This cam, as well as others on the cam shaft to be hereinafter described, operates in a single rotation a lever common to each of the spindles 30, said levers being located on opposite sides of the cam shaft. The parts of the spindle just described with the exception of the mount for the chucking levers are of old and well-known construction, and further detailed description is therefore omitted herein, as the features will be well understood by those skilled in the art.

In order to consume every moment possible and thus increase the output of the machine I have provided means whereby the rotation of the spindle may be suddenly stopped upon completion of the operation of the tools requiring this rotation. The pulley 33 has a web 49 extending from the rim inward and resting upon ball bearings 50 mounted upon a collar 51 secured to the spindle. A thrust plate 52 is secured to the spindle in any suitable manner and a clutch plate 53 is located to coöperate therewith in clutching the pulley to the spindle, the web 49 from the rim of the pulley lying between these plates. Disks 54 of fiber or other similar material are located between said plates and the web of the pulley. The clutch plate 53 is formed upon or otherwise secured to a sleeve 55 splined to the spindle, the opposite end of the sleeve bearing a brake plate 56 adapted to coöperate with a flange 57 on the bearing 32, a disk 58 of fiber or other suitable material being preferably located between said flange and plate.

A clutch and brake operating lever 59 is pivotally mounted on the bracket 47, the lower end of the lever engaging with a cam 60 on the cam shaft 25 to operate the lever in one direction and a spring or like means may be employed to hold the lever against the cam and thus operate it in the other direction, the lever being thus operated at proper times to clutch the pulley to the spindle to cause rotation of the latter, or to apply the brake against the flange 57 to stop rotation of the spindle.

The construction of the bearings for the balls 50 are such as to allow the pulley a slight lateral play in order that it may readily disengage from the clutch members upon release of the latter and thus allow the rotation of the spindle to be quickly stopped. This lateral movement of the pulley may be obtained in various ways, as shown herein, the bearings for the balls being slightly rounded, as shown in the drawings.

A spring 61 thrusting against the hub of the plate 52 and the bar 40 presses the latter against the chucking lever 42. The rod 44 is screw-threaded into the end of the spindle, the lock nut 62 holding the parts against accidental movement and by means of this rod the positions of the chucking levers 42 and hence the chuck jaws are determined, and the latter enabled to receive and hold blanks of varying sizes.

A carrier arm 63 is secured to a carrier rock shaft 64 mounted in a bearing 65 in the machine frame, this arm supporting a carrier plate 66 which is reciprocated as the shaft is rocked to present blanks to each of the spindles, the plate being secured to the arm as by means of bolts 67. A carrier operating arm 68 is secured to the rock shaft 64 and a connecting rod 69 connects the arm with a carrier operating lever 70 pivotally secured to the frame as at 71, the opposite end of the lever being in contact with a carrier cam 72 secured to the cam shaft 25. The arm 68 is connected with the rod 69 by means of a pin on the arm engaging a slot 720 in the rod, a spring 73 normally holding the pin at the bottom of the slot but yielding to allow the rod to move independently of the arm and carrier in one direction should the latter become wedged, and a spring 74 holds the lever 70 against the cam and provides a yielding force to move the lever, which spring will refuse to act and thus prevent injury should the carrier become wedged against movement in a direction opposite to that above described.

The carrier plate 66 is provided with blank recesses 75 near its opposite edges to receive the blanks that may be supplied to it from any suitable source as herein shown the blanks being supplied from a runway 76 to which they are introduced by any suitable mechanism well understood and common to machines for performing work on articles of this class. The cam 72 is shaped to impart proper reciprocating movement to the carrier to deliver a blank to each of the spindles at the proper time, the carrier thus being made to serve both spindles.

A pusher 77 is secured to a pusher support 78 pivotally mounted on a pusher slide 79 located in a slideway 80 on the frame. A pusher lever 81 is pivotally supported on the frame, as herein shown this pivotal mount being on a bracket 82 secured to the frame and which bracket contains the bearing 26 for the cam shaft at this end of the machine. The upper end of the lever engages with a slot 83 in the pusher support and the lower end of the lever engages a pusher cam 84 secured to the cam shaft 25. A spring 840 may be employed to hold the lever against the cam. A stop 841 is mounted on the fixed part of the machine against which the lever 81 strikes to limit its forward movement, that is, the movement to insert the blank within the chuck. As shown herein this top is secured in the bottom of the slideway 80 projecting therefrom sufficiently to arrest movement of said lever. It is material that the heads of the blanks should always be located in the same position, in order that the tools may properly operate thereon, and by stopping the movement of the lever at a predetermined point this location of the head is accurately determined. The construction and operation of this pusher mechanism is also well-known in machines for performing work upon the class of articles shown herein and further detailed description therefore is omitted, it being sufficient to state that the cam 84 is formed to permit proper movement of the pusher under the influence of its spring to cause it to engage the blank when the carrier has presented it in line with the axis of the spindle and force the blank between the chuck jaws on the spindle, said cam removing the pusher from engagement with the blank at the proper time. The cam 84 operates a pusher working in connection with each of the spindles.

The mechanism herein shown is peculiarly applicable for finishing heads of different forms on screws or like articles held in the spindle, and the mechanism for supporting and operating the shaving tools forms one of the features of my improved machine.

Figures 4, 7, 8, 9, 10:
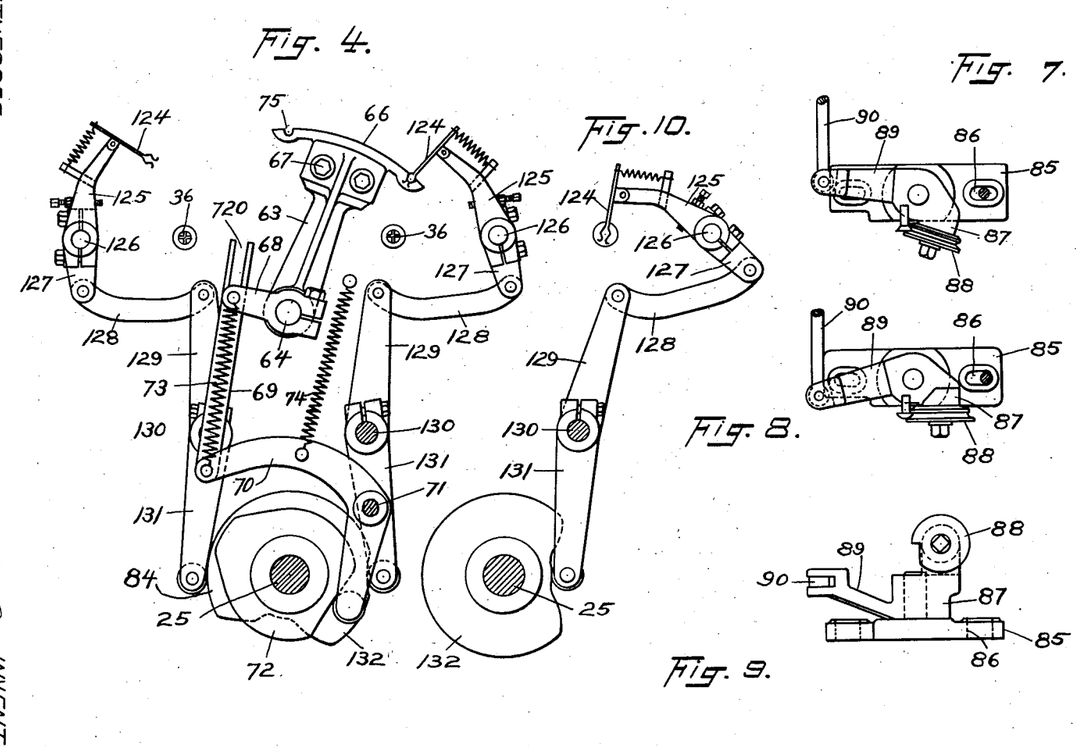
Figs. 4 and 10 are detail views illustrating the construction and operation of the feed mechanism.
Figs. 7, 8 and 9 are detail views illustrating the construction and operation of the cutters.

A shaver base 85 is adjustably mounted on the table 20 as by means of pins secured in the table and passing through slots 86 in said base. A shaver support 87 is pivotally mounted on the shaver base and carries a shaving tool or shaver 88. The cutting edge of this shaving tool is formed to work upon opposite sides, that is, the face and the back of a screw-head, as shown in Figs. 7 and 8 of the drawings, and by adjusting the position of the base the direction of movement of the shaving tool as it approaches the screw-head may be changed. This will enable the shaving tool to properly cut heads of different form. For instance, as shown in Fig. 7, a head having a beveled under surface is shown as being cut, and the base is so positioned that the shaving tool approaches the head at a certain angle to the axis of the spindle, enabling the tool to simultaneously cut the flat face of the head as well as the beveled surface at the back, whereas in Fig. 8 a round headed screw is shown having what is known as a square shoulder underneath the head. In this figure the base is shown so adjusted that the shaving tool approaches the head at a greater angle to the axis of the spindle than in the other figure, thus allowing the shaving tool to simultaneously cut the rounded face and the square shoulder at the back of the head.

An arm 89 extends from the support 87 and a connecting rod 90 extends from this arm to a shaver lever 91 pivotally mounted on the bracket 47, the lower end of the lever engaging a shaver cam 92 secured to the cam shaft 25. A spring 93 is located upon the rod 90 and presses at one end against the arm 89 and at the other end against a stop 94, forcing the shaver away from the blank while the lever 91 in connection with the cam forces the shaver up to the work. As in the case of other tools, there is a shaver and its operating mechanism appurtenant to each of the spindles, a single cam operating both of the shaver levers.

A swinging saw bracket 95 is mounted in brackets 96 secured to the frame of the machine, a saw feed lever 97 extending from the bracket and being properly equipped at its lower end for engagement with a saw feed cam 98 on the cam shaft 25. The mount for this bracket is obtained by means of trunnions 114 on the swinging bracket resting in the stationary bracket, and an oil chamber 113 is formed in the swinging saw bracket to retain a lubricant for the meshing gears hereinafter referred to.

A saw driving shaft 99 is mounted in the trunnions 114 of the swinging saw bracket, one end of the shaft bearing a bevel gear 100 in mesh with a bevel gear 101 fast to and driven by the driving shaft 22. A pinion 102 secured to the shaft 99 meshes with a gear 103 on a saw spindle 104 mounted in the upper part of the swinging saw bracket, said gears being located in the oil chamber 113, as plainly shown in Fig. 5 of the drawings. The pinion 102 is of considerable length to permit a certain lateral movement of the swinging saw bracket to position the saws with respect to a blank held in either spindle.

The saw shifting rod 105 is secured in the end of one of the trunnions 114 of the swinging saw bracket, this rod bearing a stop block 106 adapted to operate against the stops 107 on the stop rod 108 secured in the bracket 96. These stops in the construction shown herein are in the form of nuts adjustable along the rod and they may be locked in position as by the lock nut shown. Collars 109 are spaced apart upon the shifting rod 105, as shown herein an enlargement 110 within which the stop block 106 is secured, forming this spacing element. These collars have a slight movement longitudinally of the stop rod, and springs 111—112 are located one between a collar and the adjacent end of a trunnion and the other between the other collar and a stop 115 adjustably secured to the end of the stop rod.

A saw shifting lever 116 is pivotally mounted on the frame of the machine, one end of the lever engaging in the groove formed by the collars 109 and the other end of the lever extending and being equipped to engage and be operated by the saw shifting cam 117 secured to the cam shaft 25. This saw shifting cam bears an adjusting screw 118 screw-threaded into the cam, the head of the screw affording a rest for the saw feed cam 98 which may be moved for purposes of adjustment longitudinally of the shaft 25. The adjusting screw graduates the feed of the saw for one of the spindles, say that at the front of the machine, or the one located at the left with respect to the parts as they are seen in Fig. 5, the lever 97 being forked at its lower end, one arm bearing a cam roller 119 to engage the feed cam 98.

Figure 5:
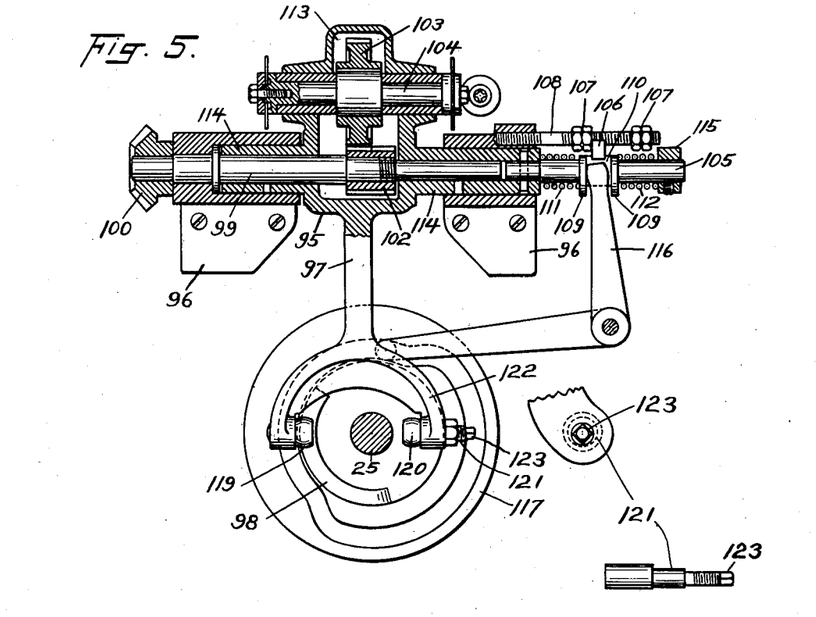
Fig. 5 is a detail view illustrating the construction and operation of the saw feed and shifting mechanism, the parts being cut in section.
Figure 6:
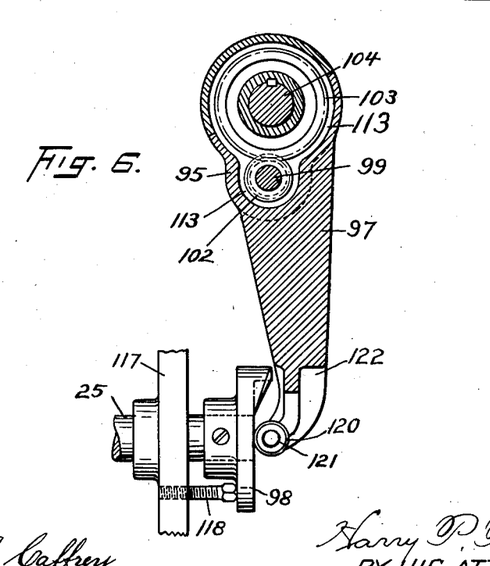
Fig. 6 is a detail view in central section through the parts shown in Fig. 5.

It will be seen from a glance at Fig. 5 that the roller 119 is in position to be engaged by the cam while the roller 120 is not in such position. When, however, the saws are shifted the lever 97 is also shifted, bringing the roller 120 in position to be engaged by the same cam formation as that which operates the roller 119. In order to provide for slight variations in diameter of the saws, the adjustment for one saw having been provided for by the screw 118 as above described the adjustment for the other saw is obtained by means of an eccentric mount for the roller 120. A pin 121 extends through the arm 122 of the lever 97, the end of this pin bearing the roller 120 being located eccentrically to the axis of the pin, so that by rotating the pin in its bearing as by a wrench applied to the square head 123 of the pin the roller 120 may be moved to or away from the cam 98.

The feed fingers, except in so far as they are operated by a single cam formation, constitute no part of the present invention, and but a brief description sufficient for an understanding of the operation by those skilled in the art will be given herein.

Briefly stated, these fingers 124 are spring fingers common to machines of this general description carried by a feed finger arm 125 secured to one end of a rock shaft 126. The end of this shaft opposite that to which the arm 125 is secured bears an arm 127 connected by a link 128 with an arm 129 secured to one end of a rock shaft 130 mounted in the bracket 47. To the other end of this rock shaft a feed finger cam lever 131 is secured, the end of the lever being equipped for engagement with and operated by the feed finger cam 132.

From the foregoing description taken in connection with the accompanying drawings it will be observed that the machine aside from the special novel details of construction embodies in its general makeup a plural number of spindles each having its coöperating mechanism to perform work upon an article carried by the spindle, each of the coöperating mechanisms, however, being actuated by the same cam formation, thus requiring but a single cam shaft.

I claim—

1. A plurality of spindles each adapted to hold an article to be operated upon, a tool appurtenant to each spindle each to operate upon an article when rotated by said spindle, a tool appurtenant to each spindle to operate upon an article when held stationary by said spindle, levers separately mounted for each tool to operate when the spindle is rotated, a single device for alternately operating each of said levers, means for operating each of the spindles alternately, means for operating the tools when the spindles are stationary, and means for alternately stopping the rotation of each of the spindles.

2. A plurality of spindles each adapted to hold an article to be operated upon, a tool appurtenant to each spindle to operate upon an article when rotated by said spindle, means for operating said tools, a tool appurtenant to each spindle to operate upon an article when held stationary by said spindle, levers separately mounted to actuate each of said last mentioned tools, a single device for alternately operating said levers, means for rotating each of the spindles alternately, and means for alternately stopping the rotation of each of the spindles.

3. A plurality of spindles, a plural number of sets of devices each set appurtenant to a spindle, each device in each set performing a like operation as the similar device in another set upon an article held in the spindle to which it is appurtenant, means for rotating the spindles, levers separately mounted for each similar device in opposite sets, a single cam formation adapted to alternately operate each one of said levers, and means for operating said cams.

4. A plurality of spindles, a plural numfor holding a blank, means for operating the spindles, a saw supported to operate upon a blank held by each spindle, a shiftable support for said saws, a single cam roll for shifting said saws, and a single cam to feed both of the saws toward the blanks held by the spindles.

16. A pair of spindles each having means for holding a blank, means for operating the spindles, a swinging bracket, saws supported on said bracket, each saw being adapted to act in connection with one of said spindles, and a single cam formation arranged to swing said bracket to operate said saws in connection with both spindles.

17. A pair of spindles each having means for holding a blank, means for operating the spindles, a swinging bracket, saws supported on said bracket, each to act in connection with one of said spindles, means for shifting the bracket, arms, one appurtenant to each spindle and projecting from the bracket, and a single cam formation arranged to operate alternately on said arms to swing said bracket to operate said saws in connection with both spindles.

18. A pair of spindles each having means for holding a blank, means for operating the spindles, a number of pairs of tools, both members of each pair being alike, for operating upon a blank held by each spindle, and a single operating means for each pair of tools, said operating means actuating the tools of a pair alternately to operate upon a blank.

19. A pair of spindles each arranged to hold a blank, means for operating the spindles, a swinging saw bracket mounted in operative relation to the spindles, said bracket being formed to constitute an oil case and mounted for lateral movement and for swinging movement, an operating shaft extending through the oil chamber in said bracket, means for operating the shaft, a saw shaft extending through said oil chamber, a saw mounted on each end of the shaft outside of the chamber, connections within said chamber between said shafts, means for rocking the bracket on its pivot, and means for shifting it laterally.

20. A swinging saw bracket having trunnions mounted in a fixed support, said bracket being movable laterally, an operating shaft extending through said bracket, means for holding said shaft against lengthwise movement, means for rotating the shaft, a saw shaft mounted in said bracket, a saw secured to the saw shaft, connections between said shafts, means for swinging the bracket, and means for shifting it laterally.

21. A swinging saw bracket mounted for lateral movement in a rigid support, an operating shaft extending within the bracket, means for rotating said shaft, a saw shaft mounted in the bracket, connections between said shafts, a saw secured to the saw shaft, means for alternately shifting the bracket laterally in opposite directions, and means for swinging the bracket at the end of each lateral movement.

22. A saw bracket mounted for swinging movement and for sliding, a plural number of saws carried by said bracket, means for operating the saws, a bracket operating lever, means for sliding the bracket, a single cam roll arranged to operate on different parts of the lever to alternately swing the bracket to move the saws toward the blank, means for adjusting the cam roll on the shaft to determine the amount of throw of the bracket for one saw, and means for adjusting a part on the lever to determine the amount of throw of said bracket for the other saw.

23. A saw bracket mounted for swinging movement and for lateral movement, a plural number of saws carried by said bracket, means for operating the saws, a bracket operating lever for swinging the bracket, means for imparting lateral movement to the bracket, a single cam formation arranged to operate said lever, means for adjusting the cam on the shaft to determine the amount of throw of the bracket for one saw, and means for adjusting a member on the lever to determine the amount of throw of the bracket for the other saw.

24. A saw bracket mounted for swinging movement, a pair of saws carried by said bracket, means for rotating the saws, a single cam formation arranged to swing the bracket for the alternate operation of both saws, means for adjusting the cam to determine the amount of throw of the bracket for one saw, and a roll eccentrically mounted on the bracket to determine the amount of throw of the bracket for the other saw.

25. A saw bracket mounted for swinging movement in a fixed support and also for lateral movement therein, an operating shaft extending through said bracket and held against longitudinal movement, means for operating said shaft, a gear secured to the shaft within the bracket, a saw shaft mounted in the bracket, a pinion secured to the saw shaft and in sliding engagement with the gear on the operating shaft, a saw secured to the saw shaft, means for shifting the bracket laterally, and means for swinging it on its pivot.

26. Means for holding blanks, a saw bracket bearing a saw to operate upon blanks held by each of said blank holding means, said bracket being pivotally mounted, and cam rolls mounted on said bracket for its alternate reciprocation and arranged each roll to operate the bracket for operation of a designated saw.

27. Means for holding blanks, a saw bracket pivotally mounted for swinging and ber of sets of devices each set appurtenant to a spindle, and each device in each set performing a like operation as the similar device in another set upon an article held in the spindle to which it is appurtenant, some of the devices being adapted to operate upon an article when rotated by a spindle and others to operate upon said article while held stationary by said spindle, levers separately mounted for each similar device in the different sets, a single cam formation adapted to alternately operate upon each one of said levers, means for rotating the spindles, means for stopping the rotation of the spindles, and means for operating said cam.

5. A plurality of spindles, cutting tools appurtenant to each spindle and adapted to operate upon an article when rotated thereby, a lever separately mounted to operate each of said tools, a single cam formation for alternately operating each of said levers, cutting tools adapted to operate upon an article held stationary by each spindle, a lever separately mounted to operate each of said last mentioned tools, a single cam formation for operating said last mentioned levers, means for rotating the spindle, and means for stopping its rotation.

6. A plurality of spindles, cutting tools each appurtenant to a spindle and all mounted on a single carrier for movement into coöperative relation with a spindle, means for shifting the carrier, a single cam formation acting on different parts of the carrier in its different positions to cause the tools to operate alternately on the blanks in said spindles, and means for operating the spindles.

7. A plurality of spindles, a cutting tool appurtenant to each spindle and adapted to operate upon an article when rotated thereby, cutting tools each appurtenant to a spindle mounted on a single carrier for movement into coöperative relation with a spindle, a single cam formation for alternately operating the first-mentioned cutting tools, a single cam formation for shifting said carrier, a single cam formation for feeding said last-mentioned cutting tools to operate alternately on blanks in said spindle, means for rotating the spindle, and means for stopping its rotation.

8. A pair of spindles, a reciprocating carrier adapted to receive blanks, means for supplying blanks to the carrier, means for reciprocating the carrier to deliver a blank to either of said spindles, means for removing blanks from said carrier, and a single cam formation for operating each of said removing means in connection with both spindles.

9. A plural number of spindles with means for operating them, a plural number of mechanisms arranged to operate in connection with each spindle, each of said mechanisms operating in connection with one spindle being of similar construction to that operating in connection with the other spindle, levers separately mounted to operate each of the mechanisms of similar construction, and a single cam formation arranged to alternately operate all of the levers appurtenant to the mechanisms of like construction operating in connection with all of the spindles.

10. A plural number of spindles with means for operating them, a plural number of mechanisms arranged to operate in connection with each spindle, each of said mechanisms operating in connection with one spindle being of similar construction to that operating in connection with the other spindle, levers separately mounted to operate each of the mechanisms of similar construction, and a single cam formation adapted to operate in sequence all the levers appurtenant to the mechansms of like construction operating in connection with all of the spindles.

11. A pair of spindles with means for operating them, mechanisms of similar construction arranged to operate in connection with each spindle, each of said mechanisms having a separately mounted cam operated device, a cam shaft located between said devices and a single cam formation upon said shaft arranged to alternately operate said devices.

12. A pair of spindles with means for operating them, a plural number of mechanisms arranged to operate in connection with each spindle, each of said mechanisms operating in connection with one spindle being of similar construction to that operating in connection with the other spindle and each of said mechanisms having a separately mounted cam operated device, a cam shaft for operating said mechanisms for both spindles, said shaft being located between said cam operated devices of the mechanisms operating in connection with each spindle, the cams on said cam shaft each having a single cam formation operating the cam operated devices of mechanisms of similar construction appurtenant to both spindles.

13. A pair of spindles each having means for holding a blank, means for operating the spindles, a tool carrier appurtenant to each spindle, a single cam formation arranged to alternately operate said carriers and connections separately mounted and operated with each of said carriers to cause its operation by said cam.

14. A plural number of spindles each having means for holding a blank, means for operating the spindles, saws supported to operate upon the blanks held by each spindle, and a single cam roll for alternately operating the saws in connection with the spindle to which it is appurtenant.

15. A pair of spindles each having means for lateral movement, saws mounted upon the bracket, means for swinging the bracket, a lever for imparting lateral movement to the bracket, a yielding connection between said lever and said bracket, and means for operating the lever.

28. Means for holding blanks, a saw bracket mounted for pivotal movement and for lateral movement, means for swinging the bracket, a stop located on a fixed part to determine the limit of lateral movement of the bracket, a lever for causing said lateral movement, a yielding connection between the lever and bracket, and means for operating the lever.

29. A pair of spindles each having means for holding a blank, means for operating the spindles, a saw bracket pivotally mounted and having lateral movement, saws mounted upon the bracket one appurtenant to each spindle, means for swinging the bracket, a lever for imparting lateral movement to the bracket, a stop to determine the limit of lateral movement of the bracket, a yielding connection between said lever and bracket whereby the lever may be moved after the lateral movement of the bracket ceases, and means for operating the lever.

HARRY P. TOWNSEND.

Witnesses:
N. W. CUMMINS,
JAMES J. CAFFREY.